United States Patent [19]

Ferrar

[11] 3,931,493
[45] Jan. 6, 1976

[54] APPARATUS AND METHOD FOR THE PRODUCTION OF METAL VAPOR

[75] Inventor: Carl M. Ferrar, Rockville, Conn.

[73] Assignee: United Technologies Corporation, Hartford, Conn.

[22] Filed: Oct. 15, 1974

[21] Appl. No.: 514,541

Related U.S. Application Data

[62] Division of Ser. No. 372,116, June 21, 1973, Pat. No. 3,863,178.

[52] U.S. Cl. .................................. 219/274; 219/275
[51] Int. Cl.² ........................................ F22B 3/02
[58] Field of Search ................ 219/271, 274, 275; 331/94.5 G; 118/48–49.5

[56] References Cited
UNITED STATES PATENTS

| | | | |
|---|---|---|---|
| 3,506,803 | 4/1970 | Hart | 219/273 |
| 3,607,368 | 9/1971 | Van Amstel | 219/274 X |
| 3,654,467 | 4/1972 | Tittman et al. | 331/94.5 G |
| 3,723,706 | 3/1973 | Van Amstel | 219/274 X |

Primary Examiner—C. L. Albritton
Attorney, Agent, or Firm—Anthony J. Criso

[57] ABSTRACT

Disclosed is a technique for producing vapors of metals in containment vessels that experience the melting temperature but not the boiling temperature of the metal being vaporized. The metal is maintained in molten pools by the containment vessel. Pumping means such as wicks transfer the metal from the pools to a higher temperature region internal of the containment vessel where the liquid metal is boiled into a vapor. The generation of laser radiation from an excited metal vapor produced in this manner is also disclosed.

5 Claims, 3 Drawing Figures

APPARATUS AND METHOD FOR THE PRODUCTION OF METAL VAPOR

CROSS REFERENCE TO RELATED APPLICATION

This is a division of application Ser. No. 372,116, filed June 21, 1973, now U.S. Pat. No. 3,863,178.

BACKGROUND OF THE INVENTION

1. Field of Invention

This invention relates to the production of vapors and more particularly to the production of vapors of metals in an enclosure. The invention herein described was made in the course of or under a contract or subcontract thereunder, with the Department of the Navy.

2. Description of the Prior Art

Various devices have been utilized in the past to produce metal vapor. Typically, an enclosure is constructed of a material that is both mechanically and chemically stable at the evaporation temperature of the metal from which the vapor is to be produced and is wrapped with means which provide sufficient energy internal to the enclosure to vaporize the solid or liquid metal contained therein. Obviously, the enclosure material must be chemically nonreactive with respect to the metal and also must be able to satisfy the containment requirements at the evaporation temperature of the metal. Thus, the number of metals which can be readily vaporized in this manner is severely limited because the evaporation temperature of many metals is so high. Further, since the prior art systems involve heating the entire enclosure to the evaporation temperature of the metal, the radiative heat losses from the system are very large.

SUMMARY OF THE INVENTION

An object of the present invention is to produce metal vapor.

Another object of the present invention is to produce laser radiation from a metal vapor.

According to the present invention, a reservoir of a metal working medium is maintained just above its freezing temperature in a containment vessel and the liquid medium is transferred by suitable means from the reservoir to a higher temperature region for boiling and the heat of vaporization is added; the vapor phase medium moves rapidly to a cooler surface where it is condensed and the condensate gravitates back to the reservoir.

One feature of the present invention is the region maintained at or near the boiling temperature of the metal is significantly smaller than the region maintained just above the freezing temperature of the metal. Another feature is the region maintained at the metal boiling temperature is located internal to the enclosure containing the metal vapor. Also the evaporator imparts a high kinetic energy to the working medium particles and these high velocity particles traverse the space between the evaporator and the condensation surface.

A primary advantage of the present invention is the relatively low radiative heat loss from the walls of the containment vessel and the resulting reduction in the amount of heater power consumed. Another advantage is the rapid movement of the metal vapor from the boiling region to the condensation region. Also, the present invention permits the construction of containment vessels from a wider variety of materials for any given working medium and it is possible to produce vapors in an enclosure with working media which heretofore could not be suitably contained.

The foregoing and other subjects, features and advantages of the present invention will become more apparent in the light of the following detailed description of preferred embodiments thereof as illustrated in the accompanying drawing.

DESCRIPTION OF PREFERRED EMBODIMENTS

Figure 1:
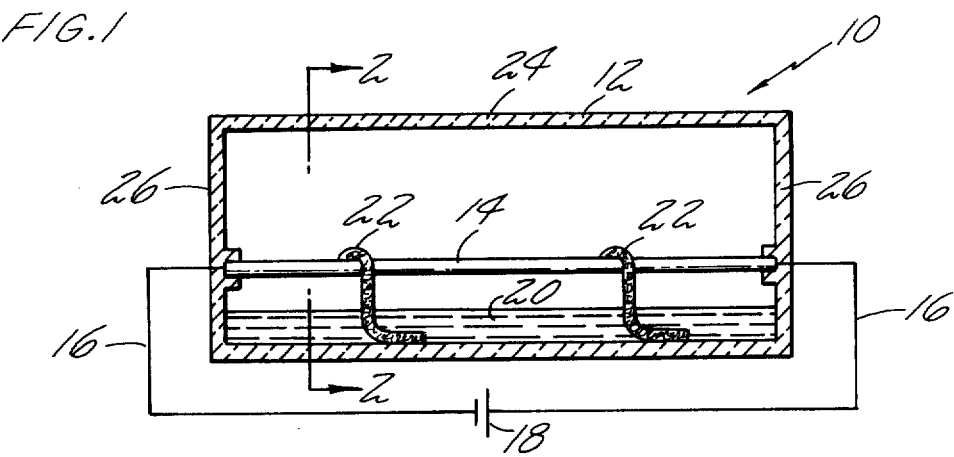
FIG. 1 is a simplified cross sectional elevation view of a metal vapor generator in accordance with the present invention.

The present invention permits the production of a working medium vapor in an enclosure formed of a material having properties that can contain the medium at its melting temperature but may not necessarily be able to contain the medium at its boiling temperature. A simple structure which permits the invention to be described more fully is shown in FIG. 1. A vapor generator 10 comprises a cylindrical enclosure 12 and includes an internally supported heater rod 14. Electrical leads 16 connect the rod to a power source 18. A reservoir 20 of a suitable medium is located in the bottom of the enclosure and wire wicks 22 are extended between the reservoir and the heating rod.

In the operation of this device, the power source provides electrical power to the heating rod and the heat produced internal thereof by the resistive dissipation of the electrical power is sufficient to cause the frozen working medium in the reservoir to melt and assume the liquid phase. The liquid then travels along the wicks by capillary action up to the heater rod. The temperature of the rod is maintained sufficiently high to boil the liquid medium arriving over the wicks and the resulting vapor moves radially away from the rod toward the cylindrical wall 24 of the enclosure. By controlling the amount of electric power applied to the heating rod, and the amount of heat insulation if any external to the enclosure, the temperature of both the wall 24 and the circular end walls 26 is stabilized just above the freezing temperature of the liquid. Thus, when radially moving vapor particles contact the walls, the heat of vaporization is released to the walls and the resulting condensate rolls down along the walls back to the reservoir. When the wall temperature is maintained too high the radiation heat losses from the system increase resulting in decreased efficiency. Also, the vapor pressure in the vicinity of the walls of the enclosure increases thereby causing a flow of vapor back toward the heater rod; this latter condition is especially undesirable in the rapidly pulsed laser system. When the wall temperature is maintained too low, the working medium solidifies on the walls and interrupts the flow of the working medium. As a practical matter the heater power supply is controlled by sensing the temperature of the outer wall and providing for suitable power adjustments as the temperature varies.

Figure 2:
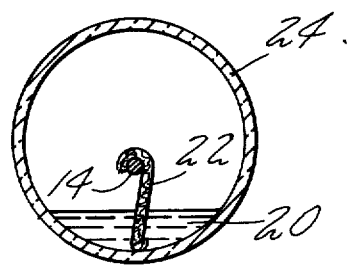
FIG. 2 is a view along line 2—2 of FIG. 1.

The primary heat loss from the generator results from the radiative losses at the cylindrical walls 24, as is apparent from the relative sizes and positioning of the heating rod and the walls shown in FIGS. 1 and 2. The hot region in the vapor generator is the surface of the heater rod. Some of the heat from this surface is conducted into the liquid thereon causing a liquid/vapor phase change and some of the heat is conducted to the reservoir through the wicks. Additional heat from the rod is radiated away to either the walls of the enclosure or the reservoir. Both the radiated and conducted heat warms the reservoir and maintains it just above the melting temperature of the working medium. In addition, radiated heat as well as the heat of vaporization which is given up when vapor condenses on the walls of the enclosure combine to maintain the walls temperature just above the freezing temperature of the working medium. The walls are the cool region of the vapor generator. The boiling region which is essentially the surface of the heater rod is much smaller than the condensing surface which is essentially the surface of the enclosure. Further, with the boiling region internal to the cooler condensing region, the surface area that can produce large heat losses due to its high temperature is minimized thereby reducing the radiative heat losses from this source.

Figure 3:
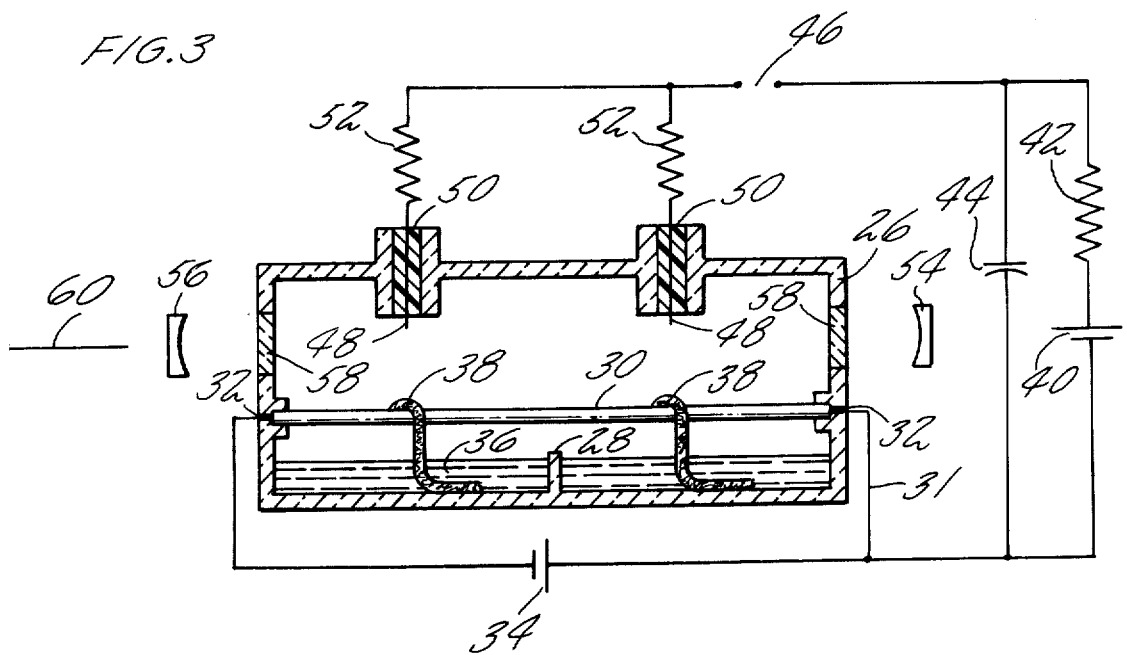
FIG. 3 is a simplified cross sectional elevation view of a metal vapor laser system in accordance with the present invention.

One practical application for the present invention is in a metal vapor laser such as the one shown schematically in FIG. 3. The system is a copper vapor laser using a quartz cylindrical enclosure 26, the inner surface of which contains a chordwise portion 28. A tungsten heater element 30 is connected by electric wires 31 which pass through wall penetrators 32 to a heater power source 34; the heater surface temperature is normally maintained at about 1700°C. During operation of the laser, pools 36 of molten copper maintained just above 1100°C form in the pockets defined between a separator 28 and the end walls; tungsten wire wicks 38 extend between the heater element and the pools. Unless a separator is placed between adjacent pools having a wire wick to the heater element, the electric power from the source 34 takes the path of least electrical resistance, enters one end of the heater element, passes down the first wick, through the molten copper and back up the last wire wick. The result is that little heat energy is dissipated in the tungsten heater element. The laser system also includes an excitation power source 40, a resistor element 42, a capacitor 44, a spark gap 46 and a plurality of electrodes 48 which penetrate the enclosure 26 through sealing plugs 50. Each electrode 48 has a current limiting resistor 52. An optical cavity for producing stimulated laser radiation from a suitable gain medium is formed between a fully reflecting mirror 54 and a partially reflecting mirror 56. A window 58 penetrates each end of the enclosure adjacent to the mirrors; the window is quartz or sapphire, both of which are highly transmissive at the wavelength of the copper laser radiation. The radiative heat losses at 1700°C are approximately five times greater than the radiative heat losses at 1100°C. Thus, the decrease in heater power requirements and system overall heat loss is readily apparent for the copper laser example.

As is shown in FIG. 3, each of the electrodes 48 is in electrical series with a corresponding electrode resistor 52. The purpose of the electrode resistors is to limit the current through the electrode of concern in the event that a shorting condition of electric discharge should develop between the particular electrode and the heater element 30.

In the operation of the copper metal vapor laser in a pulsed mode, the excitation power source charges the capacitor 44 and as the spark gap 46 breaks down, the capacitor discharges between the electrodes 48 and the heater element 30 which is at ground electrical potential with respect to the electrodes. The spark gap 46 then deionizes and the capacitor charging and electrode discharging procedure can be repeated. The discharge of electrical power in the metal vapor between the electrodes and the heater element creates a population inversion in the atoms of the metal vapor and causes stimulated emission of laser radiation which circulates in the resonant cavity formed between the mirrors 54, 56 and results in output pulses 60 of useful laser radiation. Rapid diffusion of the copper vapor from the heater to the enclosure walls at thermal atomic velocities removes undesirable discharge products such as ions and metastable atoms which result from the discharge and the previous laser action and facilitates the repeated lasing operation at rates in excess of one thousand times per second without pulse degradation. Transverse laser dimensions are typically one to a few centimeters, and the length ranges from several cm to more than a meter; the peak power outputs range from a few watts to hundreds of kilowatts.

In some laser applications, a buffer gas such as argon or helium is added to the enclosure in order to reduce the interaction between the metal vapor and the windows of the enclosure. The presence of the buffer gas increases the number of collisions which the metal vapor must go through before striking the walls of the enclosure in its travel from the heating element to the walls. Since the buffer gas interferes with the diffusion of the metal vapor away from the heater element to the condensing surface of the enclosure, its partial pressure is kept just high enough to minimize the effect on the windows and yet not so high that the diffusion rate suffers intolerably. For example, argon gas at a pressure of one to a few Torr has been found satisfactory in one typical copper vapor laser configuration.

Where maximum metal vapor flow rates are essential for increased removal of undesirable discharge products, the use of a buffer gas can be avoided by suitable design of the enclosure tube. For example, the tube can be made as a relatively long slender cylinder with the heating elements disposed along only a relatively short section of the centerline in the middle of the tube. With the heating element enclosed as described, the amount of metal vapor produced by the heater element and reaching the ends of the enclosure cylinder where the optical windows are located is quite small. Therefore, the interference or fogging of the windows by the metal vapor per se is minimized without a buffer gas. In this case metal condensed in the enclosure can be returned by gravity flow, wicking, or similar means to the heater region.

While there is no well-defined pressure differential between the boiling region and the condensing region in the enclosure, the vaporized particles move rapidly from the boiling to the condensing region due to their high kinetic energy which is produced at the heater element. The initial velocity of these particles is typically one hundred thousand centimeters per second in the case of copper and it is simply a function of the temperature of the heater and the mass of the particles involved. The initial velocity of the particles, somewhat referred to as their thermal atomic velocity, serves to speedily transfer them from the heater element to the condensing surfaces with substantially no interaction in transit between the various particles. Since no particles are reflected by the enclosure walls, no back pressure is created by the walls. In some cases when the vapor pressure is allowed to rise above a few Torr, as may happen if the condensing wall temperature is allowed to rise too high or a large amount of buffer gas is used, the particles can interact with each other.

Most of the systems involved run at very low pressure in the neighborhood of 1 to 5 Torr. When a buffer gas is used, the gas pressure is comparable to the metal vapor pressure, however, the vapor pressure of the metal under these circumstances is a nebulous concept and rather than attempt to describe the system in terms of pressure, reference is made more appropriately to the particle density, the actual particle density essentially corresponding to a gas pressure of 1 to 5 Torr. The reason the pressure is poorly defined in the environment of the present invention is due essentially to the high velocity of the vapor particles during their movement from the boiling to the freezing region.

While the laser embodiment shown in FIG. 3 is described in terms of a pulsed excitation and therefore a pulsed output device, the same basic device with suitable metal such as cadmium with a helium buffer gas can be operated to produce a continuous wave laser output. The transverse electric discharge which excites the vapor is maintained between the electrodes and the heater rod in the embodiment described in detail. Alternatively the transverse electric discharge can be provided between the electrodes and the active pools of molten metal. Other variations of the electric excitation technique include the use of a pair of electrodes to produce discharge which is axial with respect to the laser cavity and even multiple electrodes to produce the axial discharge.

The heater rod disclosed is tungsten although semiconductor material is a suitable alternate; semiconductors operate at a higher voltage and lower current and simplify the power supply requirements. Carbon is also a candidate material for the heater rod, however, the material selection in any given embodiment is determined to a large extent by its compatibility with the working medium metal.

Many metals are containable in their liquid state by available enclosure material and can be used as the vapor generator in accordance with the present invention. Quartz is a suitable material for the enclosure in many instances. Quartz is essentially an electrical insulator and therefore the penetration of the enclosure by the wires which provide power to the heater rod and the electrical leads which bring power to the electrodes is greatly simplified. Also, for the vapor laser application, quartz is transparent to many of the laser wavelengths of interest and therefore suitable windows to permit removal of laser energy from the enclosure can be made integral with the enclosure. Alternate enclosure materials are alumina and glass, or other ceramics depending upon the working medium selected.

The wicks which are used to transport the molten metal to the heater rod are generally twisted wires or mesh of tungsten, tantalum or molybdenum type metals. Mechanical pumping or acoustic excitation of metal droplets are considered practical alternate pumping techniques that could be substituted for the wicks. For example, mechanical or acoustic agitation could cause droplets of the liquid metal to splash onto the heater where evaporation would occur.

Although this invention has been shown and described with respect to preferred embodiments thereof, it should be understood by those skilled in the art that various changes and omissions in the form and detail thereof may be made therein without departing from the spirit and scope of the invention.

Having thus described typical embodiments of my invention, that which I claim as new and desire to secure by Letters Patent of the United States is:

1. Apparatus for continuously producing vapor from a liquid and cyclically alternating a metal working medium between its vapor and liquid phases comprising:
   a closed vessel for the containment of the working medium in either the vapor or liquid phase wherein the vessel includes an outer wall which defines a vapor region in the vessel and provides a surface upon which the vapor condenses into liquid, and a reservoir which defines a liquid region in the vessel and provides a sump into which flows the working medium condensed on the outer wall;
   a heater element internal of the vessel to provide a hot surface at a temperature sufficient to boil liquid phase working medium which is brought into contact with the surface;
   a power source for supplying energy to the heater element; and
   liquid metal transfer means for moving the working medium in the liquid phase from the reservoir region to the surface of the heater element.

2. Apparatus according to claim 1 wherein the transfer means comprises metal wicks.

3. Apparatus according to claim 2 wherein the closed vessel is substantially a horizontal right cylinder.

4. Apparatus according to claim 3 wherein the right cylinder contains at least one separator which extends radially from the lower horizontal surface toward the centerline of the cylinder to form liquid retainable pockets along the lower surface of the cylinder.

5. Apparatus according to claim 2 wherein the heater element is a semiconductor material.

* * * * *